June 1, 1948.  J. D. KENNELLY  2,442,569
WARNING-LIGHT PROJECTOR
Filed Nov. 5, 1945
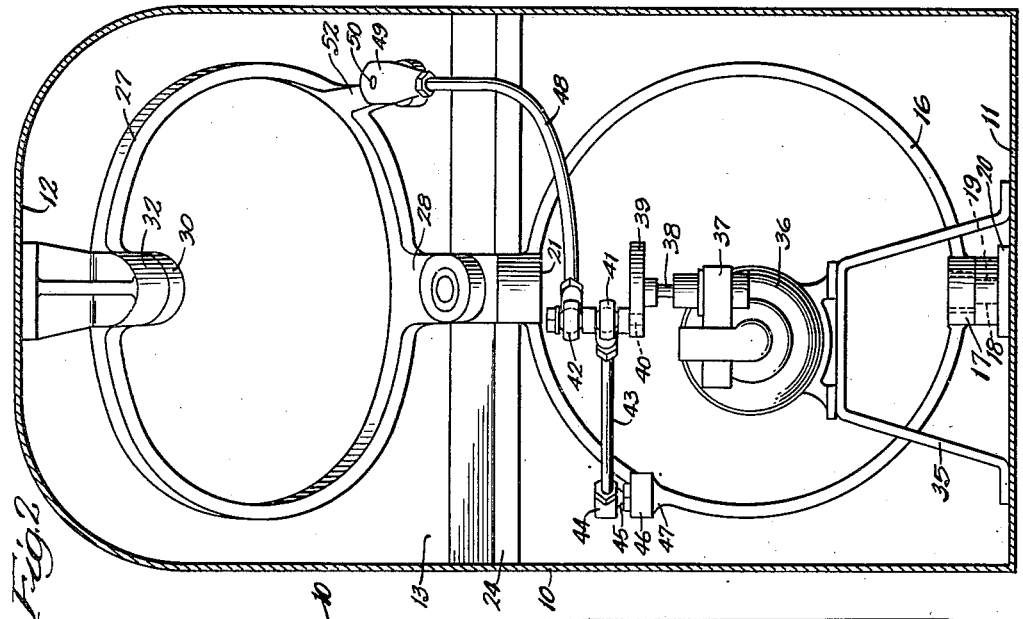
Inventor:
Jeremiah D. Kennelly,
By Dawson Booth & Spangenberg,
Attorneys.

Patented June 1, 1948

2,442,569

UNITED STATES PATENT OFFICE 2,442,569

WARNING-LIGHT PROJECTOR

Jeremiah D. Kennelly, Oak Park, Ill.

Application November 5, 1945, Serial No. 626,804

2 Claims. (Cl. 177—329)

This invention relates to a light-signal device and is particularly useful with locomotives, railway trains, and powered vehicles of other types. The invention is also useful as a warning light signal for strategic stationary locations.

An object of the invention is to provide a new form of light-signal device which is unusually efficient in warning of the approach of a locomotive or other vehicle, particularly when the same is advancing through valleys and highly irregular country. A further object is to provide a light-signal device which is highly effective by giving a changing cloud effect illumination by which people are warned of the approach of a powered vehicle even though it is out of sight. Other specific objects and advantages will appear as the specification proceeds.

The invention is illustrated, in a preferred embodiment, by the accompanying drawing, in which—

Figure 1 is a vertical sectional view of apparatus embodying my invention; and Fig. 2, a rear view in elevation of the mechanism supported within the casing.

In the illustration given, 10 designates a casing having a bottom wall 11, a top wall 12 and a partial front wall 13. A lens or transparent glass 14 is supported within the front wall, and a second lens or transparent plate 15 is supported within the top wall, extending between the front wall strip 13 and the top casing portion 12.

The ring frame member 16 is supported within the lower portion of the casing for oscillation behind the lens 14. Frame 16 is provided with a rearwardly extending bracket 17 equipped with a stud 18 received within a bearing 19 provided by the base 20. The base 20 may be welded or otherwise secured to the bottom wall 11 of casing 10. The upper portion of ring 16 is similarly provided with a bracket extension 21 and equipped with a stud 22 engaging a socket carried by the member 23. The member 23 is reinforced and supported by a cross strip 24 which extends across the casing 10. A reflector 25 is secured within ring 16 and a light bulb 26 is supported within the reflector 25 in the usual manner.

A second ring frame 27 is mounted for oscillation behind the lens 15 in the top wall of the casing. The ring 27 is provided at its lower end with a rearwardly extending bracket 28 equipped with a stud 29 received within a socket provided by the member 23. Similarly, at its upper end, the ring frame 27 is provided with a rearwardly extending bracket 30 equipped with a stud 31 received within a socket provided by the bracket member 32, which may be welded or otherwise secured to the top wall 12 of the casing. A reflector 33 is secured within the ring frame 27 and a light bulb 34 is shown secured within the reflector 33 in the usual manner. The bearings which have been described for the two ring frame members 16 and 27 may be Oilite bearings or, if desired, ball bearings or other anti-friction bearings may be employed.

Any suitable means for oscillating the light members may be employed. In the illustration given, I prefer a bracket support 35 which may be welded or otherwise secured to the bottom wall 11 of the casing, and upon the bracket is supported a motor 36 equipped with reduction gears 37. A shaft 38 driven by the reduction gears rotates a driving disk 39 equipped eccentrically with pin 40. The drive pin 40 extends through crank arm 41 which is employed for oscillating one of the lights and crank arm 42 which is employed for oscillating the other light. The arm 41 is equipped with a rod extension 43 engaging a head member 44 equipped with a drive pin 45. The drive pin 45 extends through a bearing 46 carried by an extension 47 formed integrally with the ring frame 16.

The arm 42 is equipped with a rod 48 secured to a head 49. Head 49 carries drive pin 50 which extends through a bearing 51 carried by an extension 52 which is integral with ring frame 27. It will be understood that the lights 26 and 34 and the motor 36 are connected by the usual leads to a source of current controlled by the usual switch structure.

In the operation of the device, the motor 36 and lights 26 and 34 are placed in the circuit and the motor drives through reducing gears 37 the shaft 38. The shaft 38 rotates the disk 39 equipped with its eccentric drive pin 40 and thereby arms 41 and 42 are reciprocated back and forth. The reciprocation of arms 41 and 42 together with their connecting parts to extensions 47 and 52 cause the ring frames 16 and 27 to be oscillated back and forth in front of their respective lenses. The illumination from light 26 and its reflector 25 is in a straight forward or substantially horizontal line through lens 14. The light rays projected from the light 34 and its reflector 33, on the contrary, pass upwardly through the top wall of the casing and serve to illuminate clouds and high areas in front of the vehicle.

Locomotives and other fast moving vehicles equipped with search lights and warning lights have at times found such lights wholly ineffective as a warning of the approach of same, because of winding track or roads through valleys and irregular country. As a result, serious accidents have occurred. I have discovered that if a light reflector is placed so as to project light rays through the top wall of a housing placed on the locomotive or other vehicle, the projected rays illuminate the clouds and form reflected beams which give excellent signal effects that warn of the approaching vehicle. The effect is enhanced greatly where the top light is oscillated so as to form a changing effect upon the clouds, sky or other high points of elevation engaged by the beams. The light may be supported so as to face directly upwardly in a vertical direction, and in its oscillation back and forth, an effective warning signal is produced. I prefer, however, to have the light mounted at an inclination somewhat like that shown in Fig. 1 where the inclination is a little greater than 45° from the horizontal. An inclination below 30° is found to have rapidly diminishing value. Above 30°, the cloud-effect beams become noticeable and good light signal results are obtained. A moving beam of light high in the sky, with its changing effects upon clouds, if these are present, and together also with the interruption of the beam resulting from the passage of the locomotive, etc., through a valley, produces a sweep of beam or a staccato beam which is at once noticed by all observers, and the warning is highly effective long before the locomotive or vehicle is in sight. The horizontal light which oscillates in a rather direct line above the track or road provides with the tilted light sharply diverging beams which together produce a fanned effect greatly enhancing the signal effect where the locomotive is approaching along a straight track.

While in the foregoing specification, I have set forth certain details as illustrative of a single illustrative embodiment, it will be understood that such details may be varied widely by those skilled in the art without departing from the spirit of my invention.

I claim:

1. In a light-signal device, a casing having an opening in its front wall and an opening in its top wall, a light projecting member mounted for oscillation in said casing and facing in a generally horizontal line the opening in the front of said casing, and a second light member mounted in said casing for oscillation and facing in an upward direction toward the opening in the top of said casing, and means for oscillating said light members.

2. In a light-signal device, a casing having an opening in its front wall and an opening in its top wall, a light projecting member mounted for oscillation in said casing and facing in a generally horizontal line the opening in the front of said casing, and a second light member mounted in said casing for oscillation and facing in an upward direction toward the opening in the top wall of said casing, a motor in said casing, and single means driven by said motor for oscillating said light members.

JEREMIAH D. KENNELLY.

REFERENCES CITED

The following references are of record in the file of this patent:

UNITED STATES PATENTS

| Number | Name | Date |
| --- | --- | --- |
| 1,666,196 | Cuntz | Apr. 17, 1928 |
| 1,730,335 | Rumsey | Oct. 1, 1929 |
| 2,221,483 | Kennelly | Nov. 12, 1940 |
| 2,262,239 | Kennelly | Nov. 11, 1941 |